US009781753B2

(12) United States Patent
Tsai

(10) Patent No.: US 9,781,753 B2
(45) Date of Patent: Oct. 3, 2017

(54) PROXIMITY MAP REQUEST METHOD, SERVER AND NETWORK ENTITY USING THE SAME, PROXIMITY REQUEST VALIDATING METHOD, AND SERVER AND NETWORK ENTITY USING THE SAME

(71) Applicant: Acer Incorporated, New Taipei (TW)

(72) Inventor: Wei-Chieh Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 103 days.

(21) Appl. No.: 14/863,460

(22) Filed: Sep. 24, 2015

(65) Prior Publication Data
US 2016/0205710 A1  Jul. 14, 2016

Related U.S. Application Data

(60) Provisional application No. 62/101,384, filed on Jan. 9, 2015.

(51) Int. Cl.
H04W 76/02 (2009.01)
H04W 8/00 (2009.01)

(52) U.S. Cl.
CPC ......... *H04W 76/021* (2013.01); *H04W 8/005* (2013.01); *H04W 76/023* (2013.01)

(58) Field of Classification Search
None
See application file for complete search history.

(56) References Cited

U.S. PATENT DOCUMENTS 5,920,705 A * 7/1999 Lyon ................. H04L 12/4608 370/409
2005/0122927 A1* 6/2005 Wentink ............. H04B 7/2126 370/311

(Continued)

FOREIGN PATENT DOCUMENTS

WO  2014182040  11/2014

OTHER PUBLICATIONS

3GPP, "3rd Generation Partnership Project;Technical Specification Group Services and System Aspects; Proximity-based services (ProSe);Stage 2(Release 12), " 3GPP TS 23.303, Dec. 5, 2014, pp. 1-62.

(Continued)

Primary Examiner — Robert C Scheibel
(74) Attorney, Agent, or Firm — Jianq Chyun IP Office

(57) ABSTRACT

The present disclosure proposes a proximity map request method, a server and a network entity using the same, a proximity request validating method, and a server and a network entity using the same. In one of the exemplary embodiments, the server receives a proximity map request message of a D2D discovery to request a network level user ID of the discoveree. The proximity map request message may include an application layer user ID of the discoverer and an application layer user ID of the discoveree. The server may set a notification flag according to the application layer user ID of the discoverer and the application layer user ID of the discoveree in response to receiving the proximity map request message. The server may transmit a proximity map response message comprising the network level user ID of the discoveree and the notification flag in response to setting the notification flag.

20 Claims, 9 Drawing Sheets

(56) References Cited

U.S. PATENT DOCUMENTS

| | | | | |
|---|---|---|---|---|
| 2014/0378123 | A1* | 12/2014 | Stojanovski | H04W 52/0251 455/422.1 |
| 2015/0245193 | A1* | 8/2015 | Xiong | H04W 76/023 370/328 |
| 2015/0282108 | A1* | 10/2015 | Kiss | H04L 65/1006 455/435.1 |
| 2015/0289127 | A1* | 10/2015 | Ou | H04W 8/005 455/426.1 |
| 2016/0007152 | A1* | 1/2016 | Johnsson | H04W 76/021 370/329 |
| 2016/0007185 | A1* | 1/2016 | Zhu | H04W 8/06 455/435.1 |
| 2016/0044485 | A1* | 2/2016 | Enomoto | H04W 76/023 455/41.2 |
| 2016/0044725 | A1* | 2/2016 | Enomoto | H04W 76/023 370/329 |
| 2016/0050703 | A1* | 2/2016 | Johnsson | H04W 8/005 370/329 |
| 2016/0205530 | A1* | 7/2016 | Tsai | H04W 8/005 455/41.2 |
| 2017/0019937 | A1* | 1/2017 | Kim | H04W 76/023 |
| 2017/0034865 | A1* | 2/2017 | Jung | H04W 76/02 |

OTHER PUBLICATIONS

3GPP, "3rd Generation Partnership Project; Technical Specification Group Core Network and Terminals; Proximity-services (ProSe) User Equipment (UE) to ProSe function protocol aspects; Stage 3,(Release 12), " 3GPP TS 24.334 v12.1.1, Jan. 6, 2015, pp. 1-67.

3GPP, "Technical Specification Group Services and System Aspects; Proximity-based services (ProSe); Stage 2 (Release 12)" 3GPP TS 23.303 V12.1.0, Jun. 2014, pp. 1-60.

3GPP, "Technical Specification Group Core Network and Terminals; Proximity-services (ProSe) User Equipment (UE) to Proximityservices (ProSe) Function Protocol aspects; Stage 3 (Release 12)" 3GPP TS 24.334 V1.1.0, Jul. 2014, pp. 1-59.

3GPP, "Technical Specification Group Core Network and Terminals; IMS Application Level Gateway (IMS-ALG)—IMS Access Gateway (IMS-AGW); Iq Interface; Stage 3 (Release 13)" 3GPP TS 29.334 V13.0.0, Dec. 2014, pp. 1-84.

3GPP, "Technical Specification Group Core Network and Terminals; Proximity-services (ProSe) function to ProSe application server aspects (PC2); Stage 3 (Release 12)" 3GPP TS 29.343 V12.0.0, Sep. 2014, pp. 1-16.

* cited by examiner

PROXIMITY MAP REQUEST METHOD, SERVER AND NETWORK ENTITY USING THE SAME, PROXIMITY REQUEST VALIDATING METHOD, AND SERVER AND NETWORK ENTITY USING THE SAME

CROSS REFERENCE TO RELATED APPLICATION

This application claims the priority benefit of U.S. provisional application Ser. No. 62/101,384, filed on Jan. 9, 2015. The entirety of the above-mentioned patent application is hereby incorporated by reference herein and made a part of specification.

BACKGROUND OF THE DISCLOSURE

1. Field of the Disclosure

The present disclosure generally relates to a proximity map request method, a server and a network entity using the same method, a proximity request validating method, and a server and a network entity using the same method.

2. Description of Related Art

In the field of D2D communication which is often referred to as a Proximity-based Services (ProSe) communication, a UE typically may directly discover another UE and subsequently performs D2D communication with another UE with or without the assistance of a core network such as an Evolved Packet Core (EPC). In a proximity discovery procedure, a ProSe-enabled UE may transmit a proximity request for discovering another ProSe-enabled UE are described in 3GPP TS 23.303 which are incorporated by reference herein. When the proximity discovery procedure occurs in the EPC-level, the proximity discovery procedure would involve a proximity request validation procedure by which a network entity such as a ProSe function in the EPC network would ask the a targeted UE to confirm a permission for the proximity request if a profile of the targeted UE indicates that the proximity request need to be explicitly validated described in 3GPP TS 24.334 which are incorporated by reference herein. The ProSe Function is the logical function that is used for network related actions required for ProSe. The ProSe Function plays different roles for each of the features of ProSe.

A proximity discovery procedure may involve different types of identifiers (ID). A network level user ID such as an EPC ProSe user ID (EPUID) is an identifier for EPC-level ProSe discovery and EPC support of WLAN direct communication to uniquely identify a UE registered for ProSe. This identifier could occasionally be reassigned by the ProSe Function in an EPC network. An application Layer User ID (ALUID) is an identifier that identifies a user within the context of specific application.

FIG. 1 shows a general call flow of an EPC-level ProSe discovery procedure which is consistent with 3GPP TS 23.303 for example. In step S110 and S120, in order to obtain ProSe service, UE A and UE B would perform UE registration for ProSe or D2D communication with the ProSe Function A and ProSe Function B residing in their respective home public land mobile networks (Home PLMNs), respectively. In step S130 and S140, in order to check an authorization of the requested application in the ProSe function (such as the ProSe Function A and the ProSe Function B) and request the APP server to register UE's ALUID with an EPUID, UE A and UE B would perform application registration for ProSe with the ProSe Function A and the ProSe Function B residing in their respective Home PLMNs, respectively. In step S150, UE A would make a proximity request (to possibly indicate a window of time during which the proximity request is valid) for UE B. For example, UE A might be alerted for proximity with UE B. In response to the proximity request, ProSe Function A would request for a location update for UE A and for UE B. The location updates could be periodic or could be based on a triggered event or both. In order to request location updates for UE A, ProSe Function A would contact the SUPL Location Platform (SLP) A. Similarly, in order to request a location update for UE B, ProSe Function A would contact ProSe Function B, which would request a location update for UE B from SLP B.

In step S160 and S170, the locations of UE A and UE B could be reported to their respective ProSe Functions intermittently. ProSe Function B may forward the updates of the locations of UE B to ProSe Function A based on conditions set by ProSe Function A. Whenever ProSe Function A receives the updates of the locations of UE A and/or UE B, Prose Function A may perform proximity analysis for the locations of UE A and UE B. In step S180, when ProSe Function A detects that UE A and UE B are in proximity, ProSe Function A would inform UE A that UE B is in proximity and may optionally provide UE A with an assistance information for WLAN direct discovery and communication with UE B. Similarly, ProSe Function A would inform ProSe Function B, which in turn would inform UE B of the detected proximity of UE A. The Prose Function B may also optionally provide UE B with the assistance information for WLAN direct discovery and communication with UE A.

FIG. 2 is a flow chart which illustrates an example of an EPC-level proximity request procedure. In step S210, UE A sends a Proximity Request message to ProSe Function A. In response to receiving the Proximity Request message, in step S220, ProSe Function A would perform a proximity map request procedure with the APP server. The Proximity map request procedure is used for requesting the EPUID of UE B for which UE A shall get alerts when in proximity of UE B, and the identity of the ProSe Function (PFID) for UE B as well. The APP server would have compatibility of storing of EPUIDs and ProSe Function IDs (PFIDs) and mapping of ALUIDs and EPUIDs. In step S230, ProSe Function A propagates the Proximity Request message with EPUID of UE B to ProSe Function B. Based on EPUID_B received in the step S230, ProSe Function B retrieves UE B's record such as UE B's last known location and may reject the request be sending a Proximity Request Reject message towards UE A with an appropriate cause value (S240). In step S250, the proximity request validation procedure would be performed depending on UE B's ProSe profile, UE B may be asked to confirm permission for the proximity request. In step S260, ProSe Function B requests location reporting on UE B from SLP B and acknowledges the proximity request to ProSe Function A and provides UE B's current location (if known). In step S280, ProSe Function A requests location reporting on UE A from SLP A. If UE A's current location is available and if UE B's location was included in step S260, ProSe Function A may decide to cancel the Proximity Request procedure if it determines that the UEs are unlikely to enter proximity within the requested time window. Otherwise, ProSe Function A acknowledges the proximity request to UE A (S290). Examples of the proximity request procedure are described in 3GPP TS 23.303 and TS 24.334 which are incorporated by reference herein, and the detailed descriptions would be described later.

It should be noticed that, in response to receiving a proximity map request message, the APP server would check a user of the UE B's application-specific ProSe permissions, and confirms that a user of the UE A is allowed to discover the user of the UE B. However, the privacy setting in the APP server is only accepting or rejecting the proximity request, which is not enough for an application such as a social network application and lack of privacy.

SUMMARY OF THE DISCLOSURE

Accordingly, the present disclosure is directed to a proximity map request method, a server and a network entity using the same method, a proximity request validating method, and a server and a network entity using the same method.

In one of the exemplary embodiments, the present disclosure is directed to a proximity map request method which is used by a server and the method includes not limited to receiving a proximity map request message of a D2D discovery to request a network level user ID of the discoveree, wherein the proximity map request message comprises an application layer user ID of the discoverer and an application layer user ID of the discoveree, setting a notification flag according to the application layer user ID of the discoverer and the application layer user ID of the discoveree in response to receiving the proximity map request message, and transmitting a proximity map response message comprising the network level user ID of the discoveree and the notification flag in response to setting the notification flag.

In one of the exemplary embodiments, the present disclosure is directed to a server, including but not limited to a transceiver module and a processing module coupled to the transceiver module. The transceiver is configured for transmitting and receiving data. The processing module is configured for at least but not limited to receiving a proximity map request message of a D2D discovery to request a network level user ID of the discoveree using the transceiver module, wherein the proximity map request message comprises an application layer user ID of the discoverer and an application layer user ID of the discoveree, setting a notification flag according to the application layer user ID of the discoverer and the application layer user ID of the discoveree in response to receiving the proximity map request message, and transmitting a proximity map response message comprising the network level user ID of the discoveree and the notification flag using the transceiver module in response to setting the notification flag.

In one of the exemplary embodiments, the present disclosure is directed to a proximity map request method which is used by a network entity and the method includes not limited to transmitting a proximity map request message of a D2D discovery to request a network level user ID of a discoveree, wherein the proximity map request message comprises an application layer user ID of a discoverer and an application layer user ID of the discoveree, receiving a proximity map response message in response to the proximity map request message, wherein the proximity map response message comprises the network level user ID of the discoveree and a notification flag, and transmitting a proximity request message comprising the network level user ID of the discoveree and the notification flag in response to receiving the proximity map response message.

In one of the exemplary embodiments, the present disclosure is directed to a network entity, including but not limited to a transceiver module and a processing module coupled to the transceiver module. The transceiver is configured for transmitting and receiving data. The processing module is configured for at least but not limited to transmitting a proximity map request message of a D2D discovery using the transceiver module to request a network level user ID of a discoveree, wherein the proximity map request message comprises an application layer user ID of a discoverer and an application layer user ID of the discoveree, receiving a proximity map response message in response to the proximity map request message using the transceiver module, wherein the proximity map response message comprises the network level user ID of the discoveree and a notification flag, and transmitting a proximity request message comprising the network level user ID of the discoveree and the notification flag using the transceiver module in response to receiving the proximity map response message.

In one of the exemplary embodiments, the present disclosure is directed to a D2D discovery method which is used by a network entity and the method includes but not limited to receiving a proximity request message of a D2D discovery comprising a notification flag, and transmitting a proximity request validation message in response to the proximity request message according to the notification flag in response to receiving the proximity request message.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
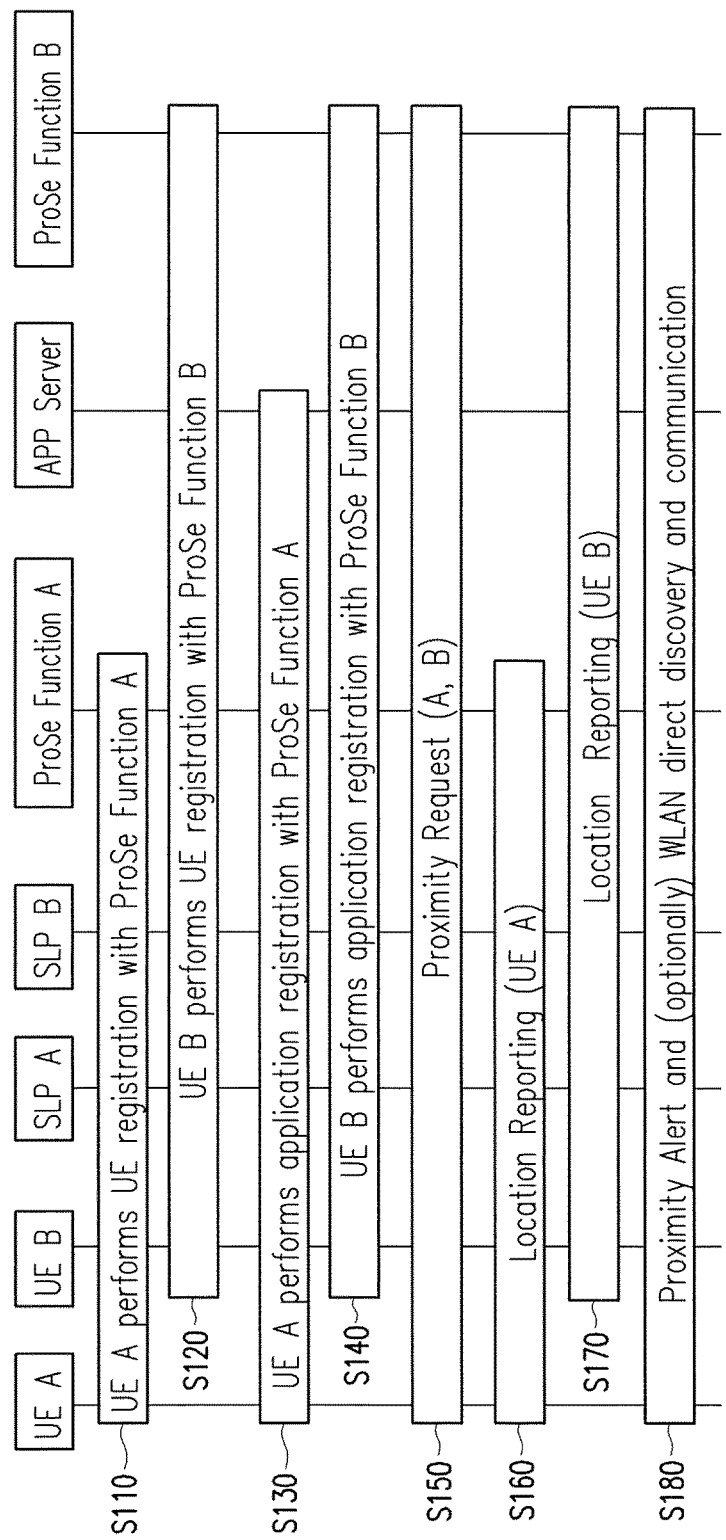
FIG. 1 shows a general call flow of an EPC-level ProSe discovery procedure.
Figure 2:
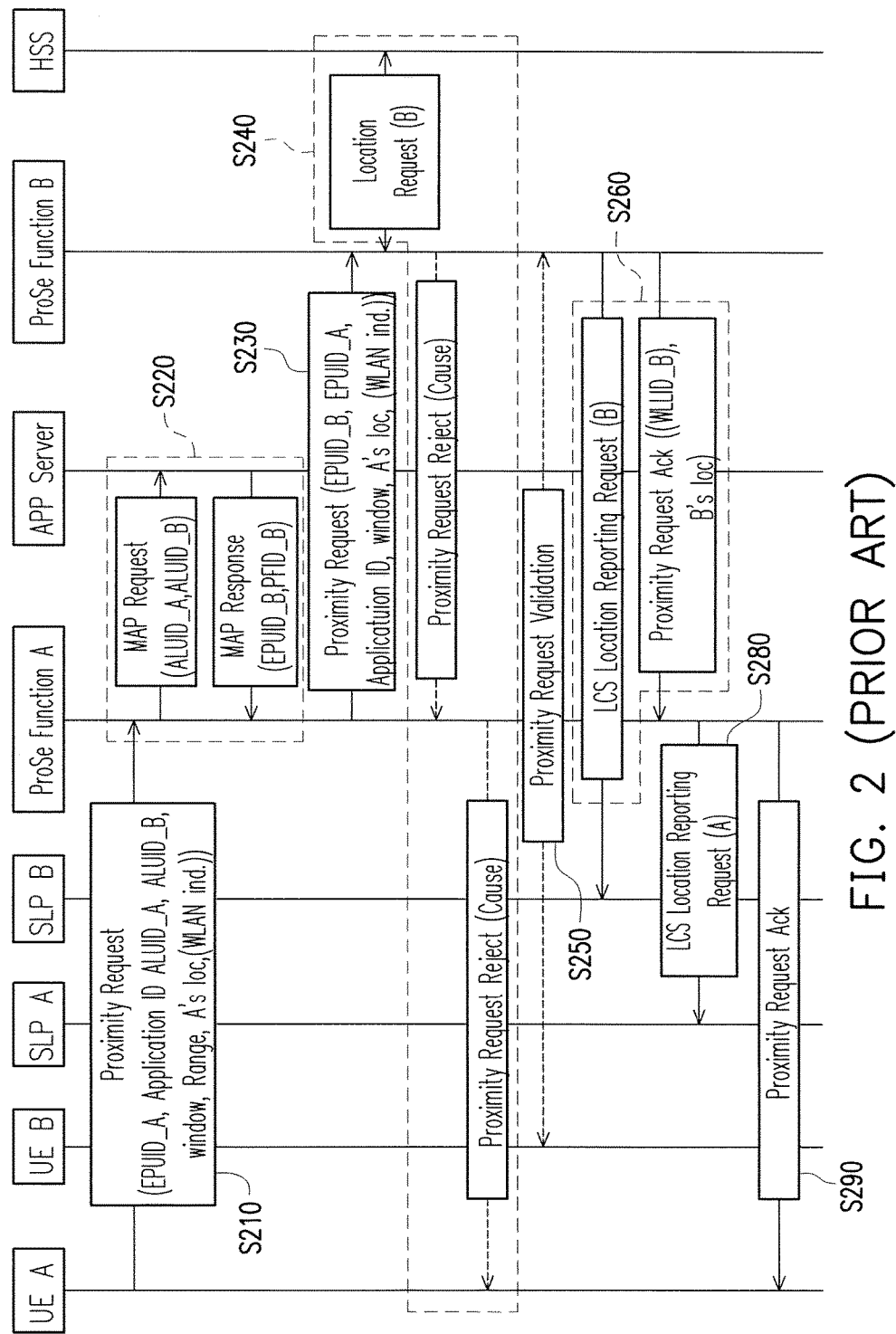
FIG. 2 is a flow chart which illustrates an example of an EPC-level proximity request procedure.

Reference will now be made in detail to the present preferred embodiments of the disclosure, examples of which are illustrated in the accompanying drawings. Wherever possible, the same reference numbers are used in the drawings and the description to refer to the same or like parts.

In order to protect privacy of network assisted D2D service such as the EPC level ProSe for social network users easily, in one of exemplary embodiments of the present disclosure, a server such as an application (APP) server would check a discoveree's D2D service permission, and set a notification flag for cancelling a proximity request validation of the D2D discovery such as proximity request validation which is consistent with 3GPP TS 29.334 or configuring a response type of the proximity request validation. In response to receiving the notification flag, a discoverer network entity such as the ProSe function A of FIG. 1 would forward the notification flag to a discoveree network entity such as the ProSe function B of FIG. 1. The proximity request validation of the discoveree network entity and a discoveree UE such as UE B of FIG. 1 would perform according to the notification flag. Reference will now be made to the present preferred embodiments of the disclosure, and it will be apparent to those skilled in the art that adjustments and applications can be correspondingly made to the following embodiments based on demands instead of being limited by the content in the following description.

Figure 3:
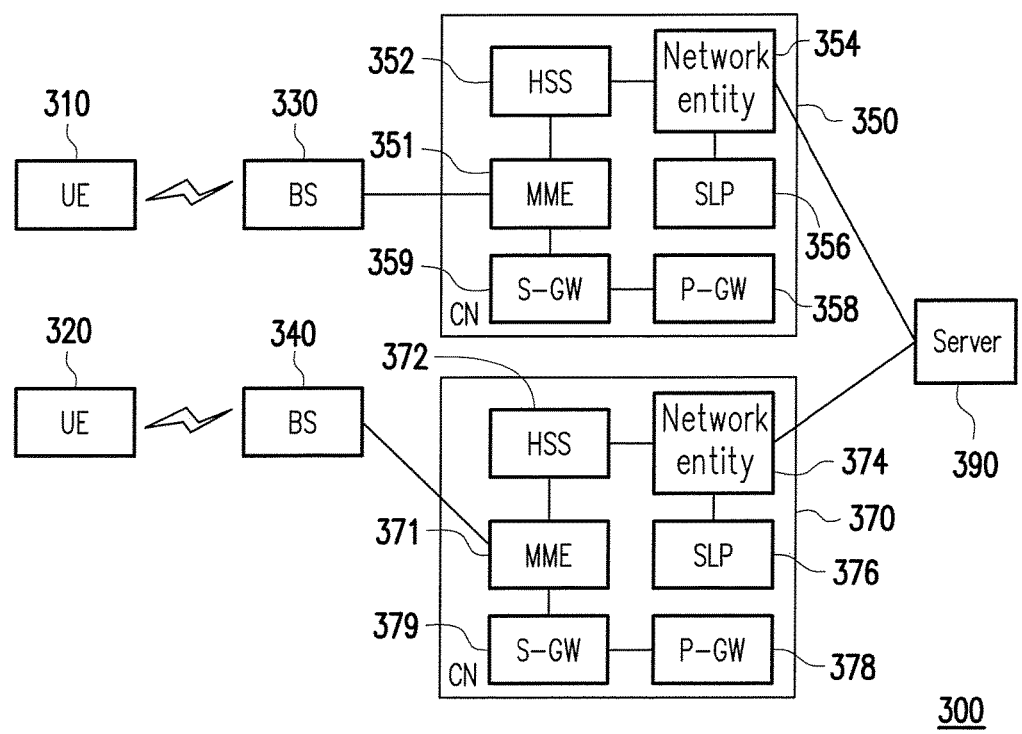
FIG. 3 is a schematic diagram illustrating a communication system in accordance with an embodiment of the present disclosure.

FIG. 3 is a schematic diagram illustrating a communication system in accordance with an embodiment of the present disclosure. Referring to FIG. 3, the communication system 300 could include but not limited to UEs 310 and 320, base stations (BSs) 330 and 340, core networks (CNs) 350 and 370, and a server 390.

The term "user equipment" (UE) such as UEs 310 and 320 in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

The term "base station" (BS) such as the BS 330 and 340 in this disclosure could represent various embodiments which for example could include but not limited to a Home Evolved Node B (HeNB), an eNB, advanced base station (ABS), a base transceiver system (BTS), an access point, a home base station, a relay station, a scatterer, a repeater, an intermediate node, an intermediary, and/or satellite-based communications base stations.

The CNs 350 and 370 may be, for example, the, 2G CN such as GPRS core network, 3G CN, or 4G CN such as Evolved Packet Core (EPC). The CN 350 may contain at least but not limited to a mobility management entity (MME) 351, a Home Subscriber Server (HSS) 352, a network entity 354, a Secured User Plane Location Platform (SLP) 356, a Packet Data Network Gateway (P-GW) 358, and a Serving Gateway (S-GW) 359. The MME 351 is connected with the BS 330, the HSS 352, and the S-GW 359. The S-GW 359 is connected with the MME 351 and the P-GW 358. The network entity 354 is connected with the HSS 352, the SLP 356, and the server 390. Similarly, The CN 370 may contain at least but not limited to a MME 371, a HSS 372, a network entity 374, a SLP 376, a P-GW 378, and a S-GW 379. The coupling relation among the MME 371, the HSS 372, the network entity 374, the SLP 376, the P-GW 378, and the S-GW 379 could be referred to the coupling relation among the MME 351, the HSS 352, the network entity 354, the SLP 356, the P-GW 358, and the S-GW 359, and therefore detailed descriptions for each element will not be repeated.

Figure 4:
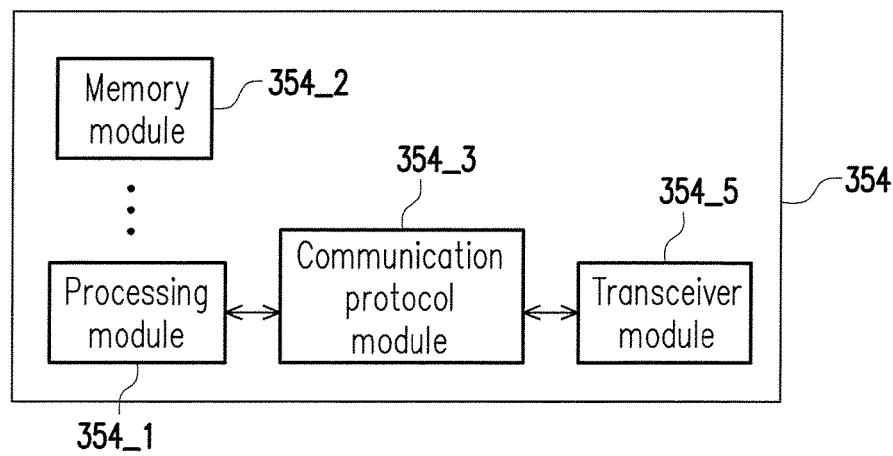
FIG. 4 illustrates an exemplary network entity in accordance with an embodiment of the present disclosure.

The exemplary network entities 354 and 374 could be ProSe Functions within an EPC network. The network entity 354 may be represented by at least the functional elements as illustrated in FIG. 4 in accordance with an embodiment of the present disclosure. The network entity 354 would include at least but not limited to a processing module 354_1 coupled to a communication protocol module 354_3 which is coupled to a transceiver module 354_5. The transceiver module 354_5 is used for transmitting and receiving modulated signals which could be wireless RF signals, optical signals, or signals sent over a cable. The communication protocol module 354_3 could be independent from or an inherent part of the processing module 354_1 and would convert a digital message into a format that is compatible with various interfaces such as PC2, PC3, PC4, PC4x, and so forth. The processing module 354_1 is configured to process digital signal and to perform procedures of the proposed D2D discovery method described in the following in accordance with exemplary embodiments of the present disclosure. Also, the processing module 354_1 may optionally be coupled to a non-transitory memory module 354_2 to store programming codes, device configurations, a codebook, buffered or permanent data, a list of application that are authorized to use network assisted D2D discovery, and so forth. The functions of the processing module 354_1 could be implemented by using programmable units such as a micro-processor, a micro-controller, a DSP chips, FPGA, etc. The functions of the processing module 354_1 may also be implemented with separate electronic devices or ICs, and functions performed by the processing module 354_1 may also be implemented within the domains of either hardware or software.

Figure 5:
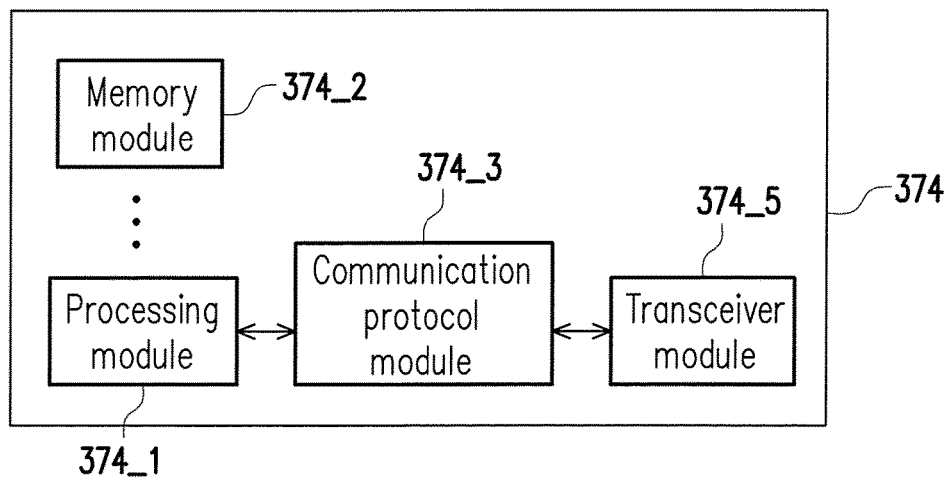
FIG. 5 illustrates an exemplary network entity in accordance with an embodiment of the present disclosure.

The network entity 374 may be represented by at least the functional elements as illustrated in FIG. 5 in accordance with an embodiment of the present disclosure. The network entity 374 would include at least but not limited to a processing module 374_1 coupled to a communication protocol module 374_3 which is coupled to a transceiver module 374_5. The detailed description of functional elements of network entity 374 may be referred to the description of functional elements of the network entity 354 in FIG. 4, and therefore detailed descriptions for each element will not be repeated.

Figure 6:
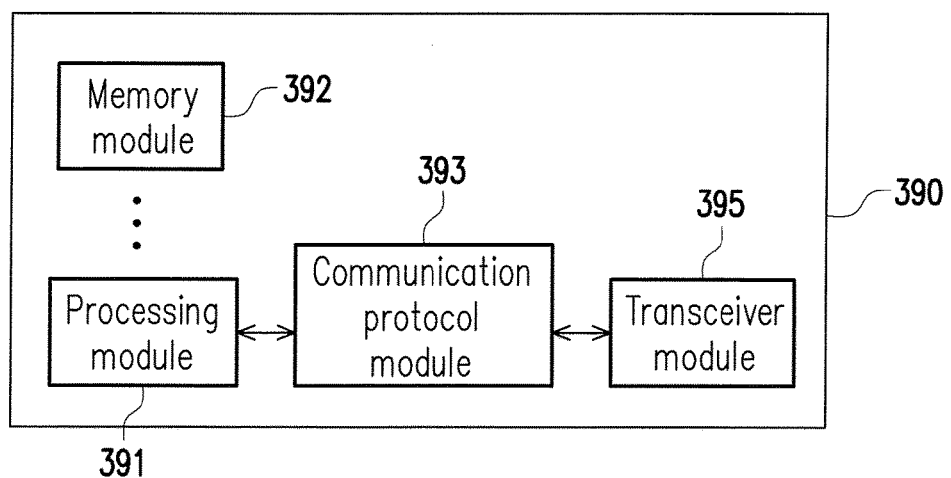
FIG. 6 illustrates an exemplary server in accordance with an embodiment of the present disclosure.

The server 390 could be a ProSe application (APP) server, a file server, a cloud server, etc. The server 390 may be represented by at least the functional elements as illustrated in FIG. 6 in accordance with an embodiment of the present disclosure. The server 390 would include at least but not limited to a processing module 391 coupled to a communication protocol module 393 which is coupled to a transceiver module 395. The detailed description of functional elements of server 390 may be referred to the description of functional elements of the network entity 354 in FIG. 4, and therefore detailed descriptions for each element will not be repeated. It should be noticed that, the memory module 392 of the server 390 further stores network level user IDs such as EPC ProSe User IDs (EPUIDs), ALUIDs (such as ALUIDs of the discoverees, ALUIDs of the discoverers), network entity IDs such as ProSe function ID (PFID), and lists of application permissions of users (such as a white list and a black list).

It should be noticed that, the aforementioned communication system 300 is assumed that the UEs 310 and 320 are belonged to the different CNs such as the CNs 350 and 370, that means the UEs 310 and 320 transmit and receive data or messages through the CNs 350 and 370, respectively. In some other embodiment of the disclosure, the UEs 310 and 320 may located within a network coverage of the BS 330 (or the BS 340), and the UE 310 and 320 both transmit and receive data or messages through the CN 350 (or the CN 370).

Figure 7:
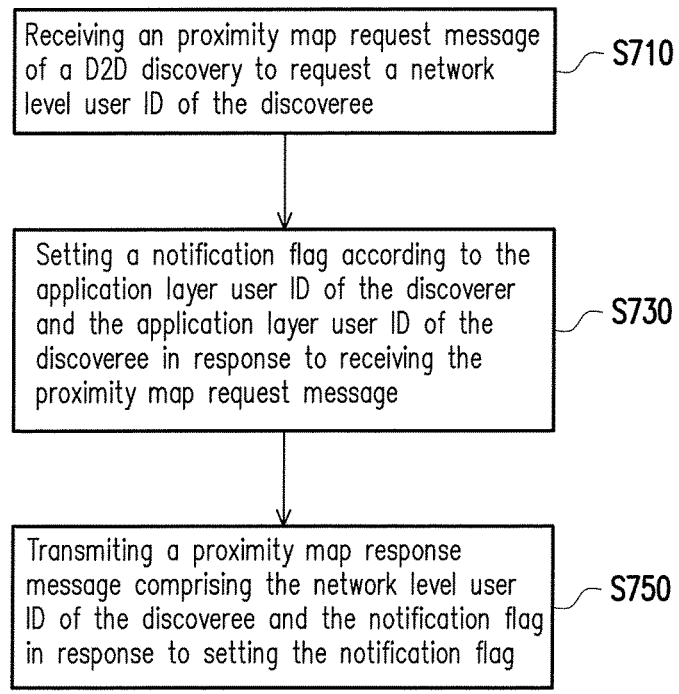
FIG. 7 is a flow chart illustrating a D2D discovery method of the server in accordance with an embodiment of the present disclosure.

FIG. 7 is a flow chart illustrating a D2D discovery method of the server 390 in accordance with an embodiment of the present disclosure. Referring to FIG. 7, in step S710, the processing module 391 of the server 390 receives a proximity map request message of a D2D discovery to request a network level user ID of the discoveree using the transceiver module 395, wherein the proximity map request message comprises an application layer user ID of the discoverer and an application layer user ID of the discoveree. For example, the proximity map request message may be a Map Request message, a ProXimity-Action-Request (PXR) command which is consistent with 3GPP TS 29.343, or any PC2 Control Protocol messages.

In step S730, the processing module 391 sets a notification flag according to the application layer user ID of the discoverer and the application layer user ID of the discoveree in response to receiving the proximity map request message. Specifically, in response to receiving the proximity map request message, the server 390 may check application permissions (such as application-specific ProSe permissions) of the discoveree such as the UE 320, to confirm that a discoverer such as the UE 310 is allowed to discover the discoveree.

In an embodiment of the present disclosure, the processing module 391 may determine whether the application layer user ID of the discoverer is conformed to a first list of the application layer user ID of the discoveree, and set the notification flag to cancel a proximity request validation of the D2D discovery in response to the application layer user ID of the discoverer being conformed to the first list of the application layer user ID of the discoveree. Specifically, the first list of the application layer user ID of the discoveree is one of the application permissions of users. The first list, such as a white list, may contain one or more application layer user ID of the discoverers which are allowed to discover the discoveree. The processing module 391 may check whether the application layer user ID of the discoverer is conformed to the first list of the application layer user ID of the discoveree. That means, the discoverer corresponding to the ALUIDs of the discoverers in the first list is allowed to discover the discoveree.

For example, a white list of User A comprises User D, User G, and User L. Assuming that a User L makes a proximity request, an APP server would receive a Map Request message comprising an ALUID of User L. The APP server determines that the ALUID of User L is conformed to the white list of User A.

Then, the processing module 391 would configure the notification flag according to the aforementioned permission result. The notification flag may be, for example, one bit, two bits, three bits, etc, value, code or a string. For example, if the ALUID of User L is in the white list of User A, the processing module 391 sets the notification flag as "00". Because the discoverer corresponding to the conformed application layer user ID is allowed to discover the discoveree, the D2D discovery request such as proximity request may not need to be validated by the discoveree. Accordingly, the proximity request validation of the D2D discovery would be cancelled according to the notification flag.

In an embodiment of the present disclosure, the processing module 391 may determine whether the application layer user ID of the discoverer is conform to a second list of the application layer user ID of the discoveree, and transmit the proximity map response message with an error information in response to the application layer user ID of the discoverer being conform to the second list of the application layer user ID of the discoveree. Specifically, the second list of the ALUID of the discoveree is also one of the application permissions of users. The second list, such as a black list, may contain one or more ALUIDs of the discoverers which are not allowed to discover the discoveree. The processing module 391 may check whether the ALUID of the discoverer is conformed to the second list of the ALUID of the discoveree. That means, the discoverer corresponding to the ALUIDs of the discoverers in the second list is not allowed to discover the discoveree.

For example, a black list of User H comprises User J and User K. Assuming that a User J makes a proximity request, an APP server would receive a Map Request message comprising an ALUID of User J. Then, the APP server would determine that the ALUID of User J is conformed to the black list of User H.

Then, the processing module 391 would configure the error information according to the aforementioned permission result. The error information may be, for example, an Error Message element, a code, or a string, which indicates the discoverer corresponding to the conformed ALUIDs of the discoverers in the second list is not permitted. For example, if the ALUID of User J is in the black list of User H, the processing module 391 would configure an Error Message of a ProXimity-Action-Answer (PXA) command which is consistent with 3GPP TS 29.343. Because the discoverer corresponding to the conformed ALUIDs of the discoverers in the second list is not allowed to discover the discoveree, the D2D discovery request such as proximity request may not need to be validated by the discoveree. Accordingly, the D2D discovery request would be rejected according to the error information.

In an embodiment of the present disclosure, the processing module 391 may set the notification flag to configure a response type of a proximity request validation of the D2D discovery. Specifically, referring to 3GPP TS 23.303 and TS 24.334, the proximity request validation of the D2D discovery is a mechanism that a discoveree can confirm a permission of the D2D discovery request such as a proximity request. However, the proximity request validation procedure may be stuck because the discoveree does not respond for confirming the permission. Accordingly, the present disclosure proposes that the notification flag may indicate the response type of a proximity request validation in response to the discoveree does not respond to the validating request such as a Proximity Request Validation message which is consistent with 3GPP TS 29.334. The response type may indicate accepting or rejecting the D2D discovery request. For example, the notification flag is set as "01" or "1" for accepting the D2D discovery request. The notification flag is set as "10" or "0" for rejecting the D2D discovery request.

In some other embodiments, when (or only when) the ALUID of the discoverer is conform to a third list such as a notification list of the ALUID of the discoveree, or the ALUID of the discoverer is not conform to the first and the second list of the ALUID of the discoveree, the processing module 391 would set the notification flag to configure the response type of a proximity request validation of the D2D discovery.

It should be noticed that, the first list, the second list, the notification flag, and the response type could be default or modified by a user or an administrator through the Internet or the server 390. For example, the social network server may provide a web site, and then subscribers of the social network server can modify the privacy setting on the web page. Table (1) is an example of a setting of the notification flags. The notification flag is a 2 bits value such as "00", "01", "10", and "11". The value "00" indicates no notification, which means the proximity request validation of the D2D discovery would be no needed or cancelled. The value "01" and "10" respectively indicate transmitting a notification and accepting or rejecting in response to no response, which means the proximity request validation of the D2D discovery would be needed, and the network entity 354 would determines to accept or reject the D2D discovery request in response to the proximity request validation response message is not received.

TABLE (1)

| 2 bits value | Indication |
| --- | --- |
| 00 | No notification |
| 01 | Notification, and accept in response to no response |
| 10 | Notification, and reject in response to no response |
| 11 | reserved |

In addition, in response to the ALUID of the discoverer being conformed to a first list of the ALUID of the discoveree or/and the ALUID of the discoverer is not conformed to a second list of the ALUID of the discoveree, the processing module 391 would provide the network level user ID of the discoveree corresponding to the application layer user ID of the discoveree such as a EPUID of the UE 320, and provide a network entity ID of the discoveree such as PFID of the network entity 374.

In step S750, the processing module 391 transmits a proximity map response message comprising the network level user ID of the discoveree and the notification flag using the transceiver module 395 in response to setting the notification flag. Specifically, after setting the notification flag or inserting the error information, the processing module 391 may transmit the proximity map response message to the network entity 354. For example, the proximity map response message may be a Map Response message, a PXA command, or any PC2 Control Protocol messages. The proximity map response message may contain the network level user ID of the discoveree, the network entity ID of the discoveree, and/or the notification flag. It should be noticed that, in some other embodiment of the present disclosure, the proximity map response message would contain the error information such as the Error Message indicating a disallowance of the permission instead of the notification flag when (or only when) the application layer user ID of the discoverer is conformed to the second list of the application layer user ID of the discoveree.

Figure 8:
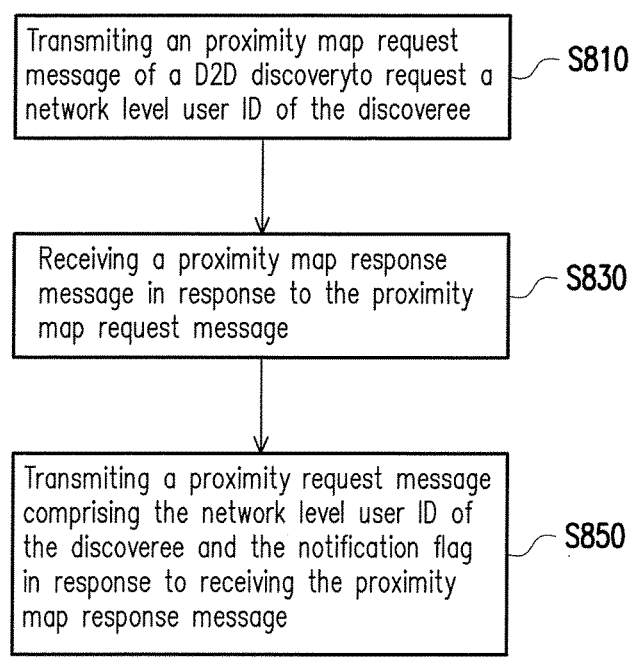
FIG. 8 is a flow chart illustrating a D2D discovery method of the network entity in accordance with an embodiment of the present disclosure.

In another view of the present disclosure, FIG. 8 is a flow chart illustrating a D2D discovery method of the network entity 354 in accordance with an embodiment of the present disclosure. Referring to FIG. 8, in step S810, the processing module 354_1 of the network entity 354 transmits a proximity map request message of a D2D discovery using the transceiver module 354_5 to request a network level user ID of the discoveree, wherein the proximity map request message comprises an application layer user ID of the discoverer and an application layer user ID of the discoveree. Specifically, in response to receiving a D2D discovery request such as a proximity request comprising the ALUID of the discoverer and the ALUID of the discoveree from the discoverer such as the UE 310, the processing module 354_1 would ask the server 390 whether the discoverer is allowed to discover the discoveree, and further requests a network entity ID of the discoveree and network level user ID of the discoveree. The further detailed description of the step S810 may be referred to the description of the step S710 of FIG. 7, and therefore detailed descriptions will not be repeated.

In step S830, processing module 354_1 receives a proximity map response message in response to the proximity map request message using the transceiver module 354_5, wherein the proximity map response message comprises the network level user ID of the discoveree and a notification flag. In an embodiment of the present disclosure, the notification flag indicates whether to cancel a proximity request validation of the proximity request message. In another embodiment of the present disclosure, the notification flag indicates a response type of a proximity request validation of the proximity request message. The notification flag may have higher priority than a default privacy setting of the network entity 354. The further detailed description of the step S830 may be referred to the description of the step S750 of FIG. 7, and therefore detailed descriptions will not be repeated.

In step S850, the processing module 354_1 transmits a proximity request message comprising the network level user ID of the discoveree and the notification flag using the transceiver module 354_5 in response to receiving the proximity map response message. Specifically, in response to obtaining the network entity ID of the discoveree such as a PFID of the network entity 354, processing module 354_1 may transmit the proximity request message to the network entity 374 according to the network entity ID. For example, the proximity request message may be a Proximity Request message which is consistent with 3GPP TS. 23.303 and TS 23.334 or any control signaling message for requesting to a permission of the proximity request of the UE 310. The proximity request message may contain parameters not limited to EPUIDs of the UEs 310 and 320, application ID, Window, Range (range class), A's loc. (location of the UE 310), the notification flag, and optionally [WLAN ind.] based on the proximity request message transmitted form the UE 310.

It should be noticed that, in an embodiment of the present disclosure, the processing module 354_1 may not transmit the proximity request message to the network entity 374 in response to receiving the proximity map response message comprising the error information. For example, if an ALUID of User Q is conformed to the black list of the User Y, an APP server would transmit a Map Response message comprising an Error Message to the ProSe function of User Q, wherein the Error Message indicates User Q is not allowed to discovery User Y. Then, the processing module 354_1 may transmit a proximity request reject message with an appropriate cause value to the UE 310 using the transceiver module 354_5. For example, a PROXIMITY_REQUEST_RESPONSE message containing a "response-reject" element with PC3 EPC Control Protocol cause value #8 "Proximity validation rejected by B side".

Figure 9:
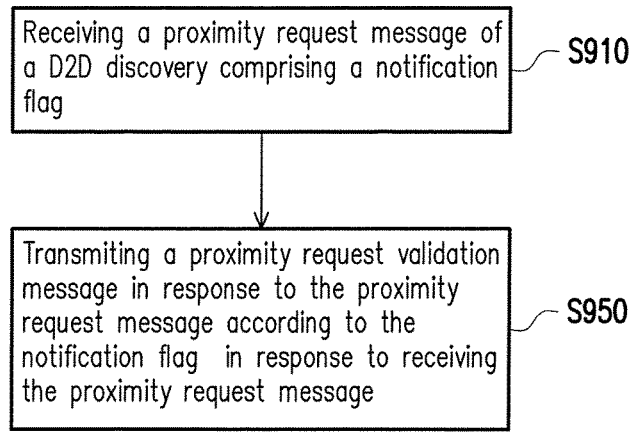
FIG. 9 is a flow chart illustrating a D2D discovery method of the network entity in accordance with an embodiment of the present disclosure.

In addition, FIG. 9 is a flow chart illustrating a D2D discovery method of the network entity 374 in accordance with an embodiment of the present disclosure. Referring to FIG. 9, in step S910, the processing module 374_1 of the network entity 374 receives a proximity request message of a D2D discovery comprising a notification flag using the transceiver module 374_5. The further detailed description of the step S910 may be referred to the description of the step S850 of FIG. 8, and therefore detailed descriptions will not be repeated.

In step S950, the processing module 374_1 transmits a proximity request validation message in response to the proximity request message according to the notification flag using the transceiver module 374_5 in response to receiving the proximity request message. In an embodiment of the present disclosure, the processing module 374_1 may cancel the proximity request validation message according to the notification flag. In other words, the processing module 374_1 does not transmit proximity request validation message to the UE 320 using the transceiver module 374_5. Specifically, in response to the ALUID of the discoverer being conformed to the first list of the ALUID of the discoveree described in the step S730 of FIG. 7, the notification flag may be set to indicate that cancelling the proximity request validation of the D2D discovery such as a proximity request validation which is consistent with 3GPP TS 29.334. Then, the processing module 374_1 may further request location reporting on the UE 320 from SLP 376 and acknowledge the proximity request to network entity 354 and provides current location of the UE 320 (if known). For example, the network entity 374 transmits a location server (LCS) reporting request to the SLP 376, and then the network entity 374 transmits a Proximity Request Ack comprising WLAN Link Layer ID (WLLID) of the UE 320 to the network entity 354.

Figure 10:
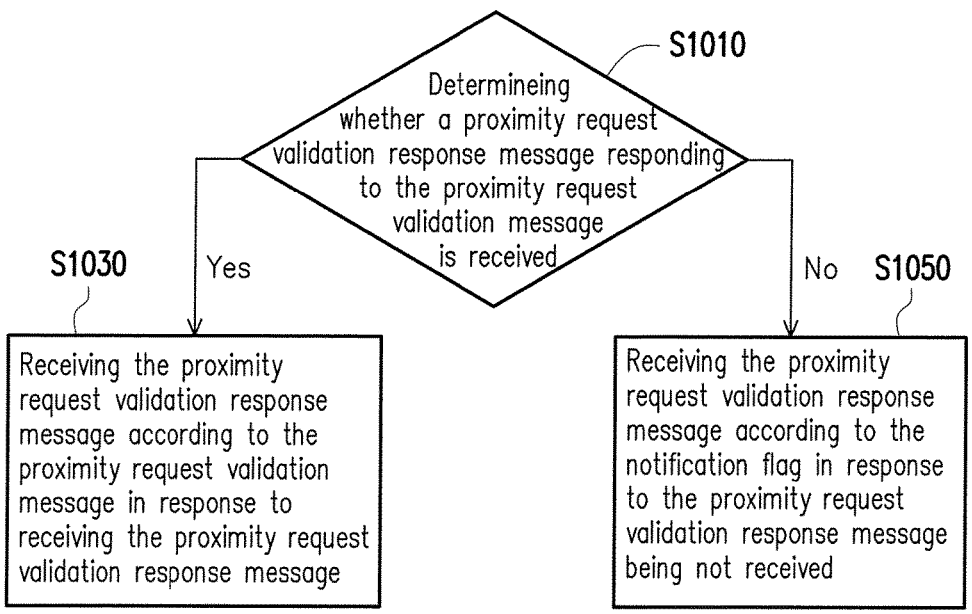
FIG. 10 is a flow chart illustrating a D2D discovery method of the network entity based on the notification flag in accordance with an embodiment of the present disclosure.

In an embodiment of the present disclosure, FIG. 10 is a flow chart illustrating a D2D discovery method of the network entity 374 based on the notification flag in accordance with an embodiment of the present disclosure. Referring to FIG. 10, in step S1010, the processing module 374_1 determines whether a proximity request validation response message responding to the proximity request validation message is received. Specifically, in response to setting the notification flag to configure the response type of the proximity request validation of the D2D discovery described in the step S730 of FIG. 7, the proximity request validation would continue to be performed. After the processing module 374_1 transmits the proximity request validation message to the UE 320 through the transceiver module 374_5, the processing module 374_1 would wait for the proximity request validation response message from the UE 320.

It should be noticed that, the proximity request validation message may be, for example, a Proximity Request Validation message which is consistent with 3GPP TS 29.334 or any other control signaling message for confirming a permission of the proximity request message of the UE 320. And, the proximity request validation response message may be, for example, a Proximity Request Validation Response message which is consistent with 3GPP TS 29.334 or any other control signaling message for responding to the permission of the proximity request of the UE 320.

In step S1030, the processing module 374_1 receives the proximity request validation response message according to the proximity request validation message in response to receiving the proximity request validation response message. Specifically, if the proximity request validation response message is received, the processing module 374_1 may check the response type of proximity request validation response message according to an accept information or a reject information comprised in the proximity request validation response message. For example, the accept information may be a "response-accept" element or any other information related to accepting the proximity request validation message. The reject information may be a "response-reject" element or any other information related to rejecting the proximity request validation message.

On the other hand, in step S1050, the processing module 374_1 receives the proximity request validation response message according to the notification flag in response to the proximity request validation response message being not received. Specifically, if the notification flag indicates the response type of the proximity request validation, the notification flag would indicate accepting or rejecting the D2D discovery request when the proximity request validation response message is not received. For example, when a timer of the network entity 374 is expired, the processing module 374_1 may assume that the UE 320 accepts or rejects the D2D discovery request according to the notification flag. For another example, the proximity request validation message may contain the notification flag. Then, when a timer of the UE 320 is expired, the UE 320 may transmit the proximity request validation response message automatically, wherein the response type of the proximity request validation response message is configured according to the notification flag.

In order to help those skilled in the art to understand how the proposed D2D discovery methods are processed in the communication system 300 according to the embodiments of the present disclosure, the following would provide three embodiments for different scenarios.

Figure 11:
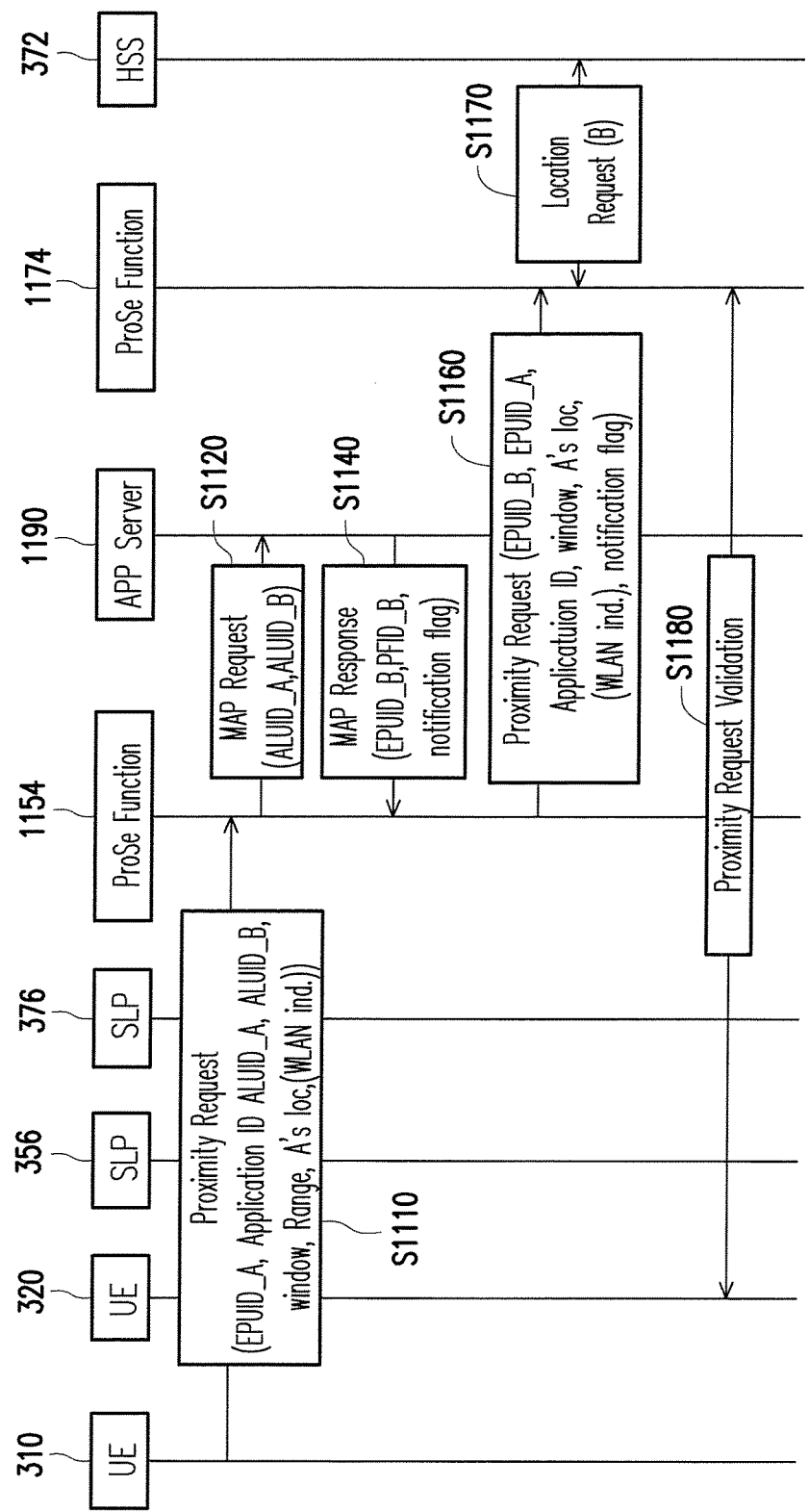
FIG. 11 illustrates a signaling diagram of a network assisted ProSe discovery process in accordance with one of the exemplary embodiment of the present disclosure.

In the first embodiment, FIG. 11 illustrates a signaling diagram of a network assisted ProSe discovery process in accordance with one of the exemplary embodiment of the present disclosure. In step S1110, the UE 310 would transmit a Proximity Request message comprising parameters not limited to EPUID_A, Application ID, ALUID_A, ALUID_B, window, Range, A's loc. (location of the UE 310), and optionally [WLAN ind.]. It should be noticed that, the term "A" and "B" are respectively presented as the UEs 310 and 320 in this embodiment. For example, the EPUID_A is presented as the EPUID of the UE 310, and so forth. In addition, the descriptions of these parameters are the same as the previously mentioned descriptions. In step S1120, in response to receiving the first Proximity Request, the ProSe Function 1154 may send a Map Request comprising parameters not limited to ALUID_A and ALUID_B to the App Server 1190 (i.e., the App Sever 1190 would be a ProSe Application Server) in order to request the App Server 1190 to provide an EPC ProSe Uer ID (EPUID) of the UE 320 and a PFID of the ProSe function 1174 for the targeted UE 320. ProSe Function 1154 would store the Application Layer User IDs (ALUID_A and ALUID_B) until the execution of the Proximity Alert procedure or until the expiry of the time window during which the proximity request is valid.

Then, the App Server 1190 checks a user of the UE 320's application-specific ProSe permissions, confirms that a user of the UE 310 is allowed to discover the user of the UE 320, and sends a Map Response (EPUID_B, PFID_B, and a notification flag) message to the ProSe Function 1154 indicating EPC ProSe User ID (EPUID_B) of the UE 320, the ProSe Function ID of ProSe Function 1174 (PFID_B) and a response type of a Proximity Request Validation such as accepting or rejecting the Proximity Request in response to no response of the Proximity Request Validation (S1140).

In step S1160, the ProSe Function 1154 would propagate another Proximity Request that is based on the Proximity Request transmitted from the UE 310 to the ProSe Function 1174. The Proximity Request transmitted from the ProSe Function 1154 would contain parameters not limited to EPUID_A, EPUID_B, window, A's loc. (location of the UE 310), the notification flag, and optionally [WLAN ind.]. Based on EPUID_B received in the step S1160, the ProSe Function 1174 may retrieve a subscriber of UE 320's record. The ProSe Function 1174 may request UE 320's last known location via the HSS 372 (step S1170). In step S1180, the ProSe Function 1174 would perform the Proximity Request Validation procedure with the UE 320 according to the notification flag. For example, if the notification flag is "01", the response type of the Proximity Request Validation would be accepting the Proximity Request when the Proximity Request Validation Response is not received. If the notification flag is "10", the response type of the Proximity Request Validation would be rejecting the Proximity Request when the Proximity Request Validation Response is not received.

Figure 12:
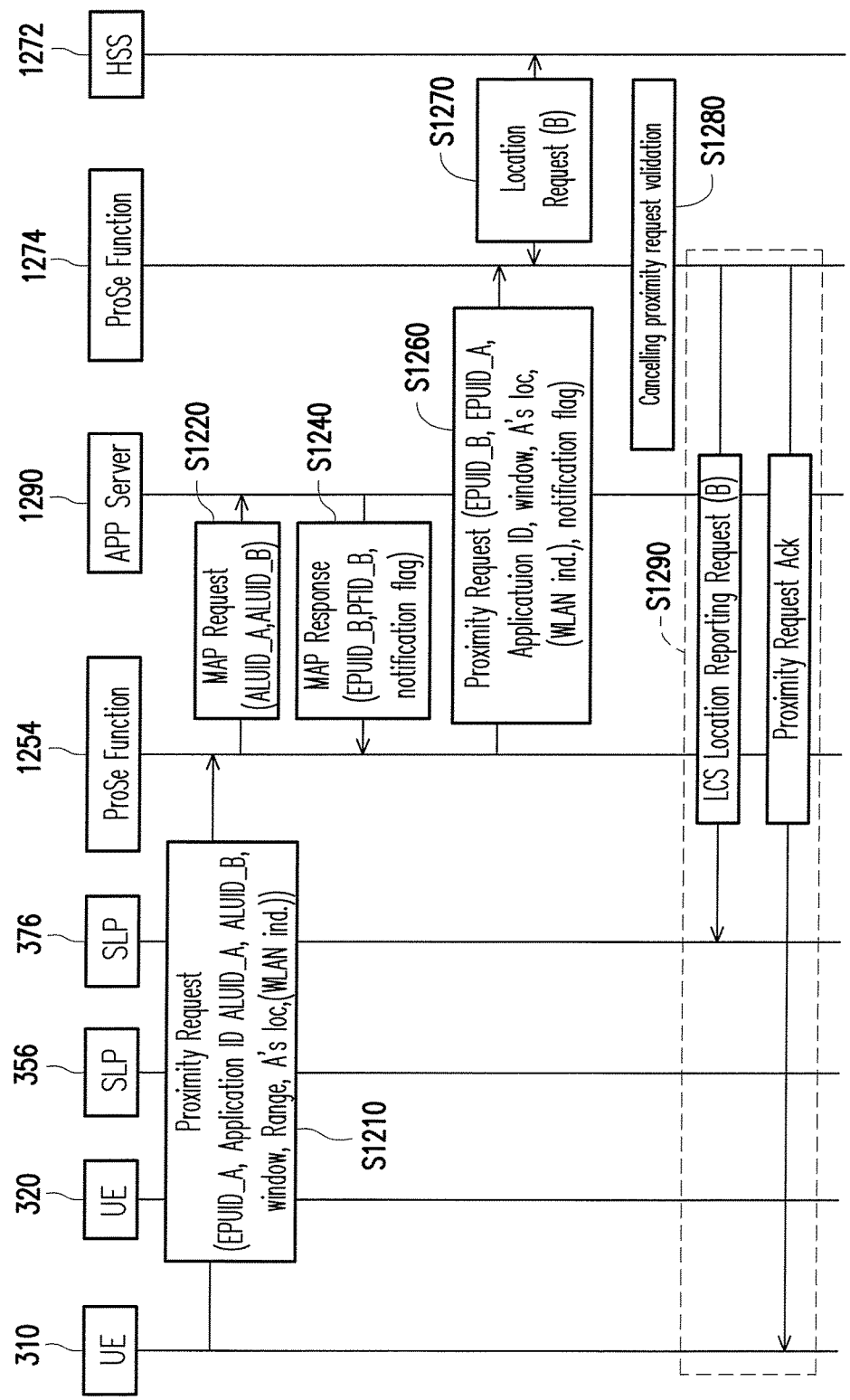
FIG. 12 illustrates a signaling diagram of a network assisted ProSe discovery process in accordance with one of the exemplary embodiment of the present disclosure.

In the second embodiment, FIG. 12 illustrates a signaling diagram of a network assisted ProSe discovery process in accordance with one of the exemplary embodiment of the present disclosure. The detailed description of the steps S1210, S1220, S1240, S1260, and S1270 may be referred to the steps S1110, S1120, S1140, S1160, and S1170 described in the FIG. 11. The difference between FIG. 11 and FIG. 12 is, in this embodiment, in response to receiving the MAP Request message from the ProSe function 1154, the APP Server 1190 would know that the ALUID_A of the UE 310 is conformed to a white list corresponding to the ALUID_B of the UE 320. Then, the MAP Response transmitted to the ProSe function 1254 would contain a notification flag indicating that the Proximity Request Validation would be cancelled (S1240). In response to receiving the notification flag from the ProSe function 1254, the ProSe function 1274 would cancel the Proximity Request Validation (S1280), which means that a Proximity Request Validation message would not be transmitted to the UE 320 for checking the permission of the Proximity Request transmitted from the UE 310. Then, a LCS Location Reporting Request message and a Proximity Request Ack would be transmitted from the the ProSe function 1274 (S1290), to continue the Proximity Request procedure.

Figure 13:
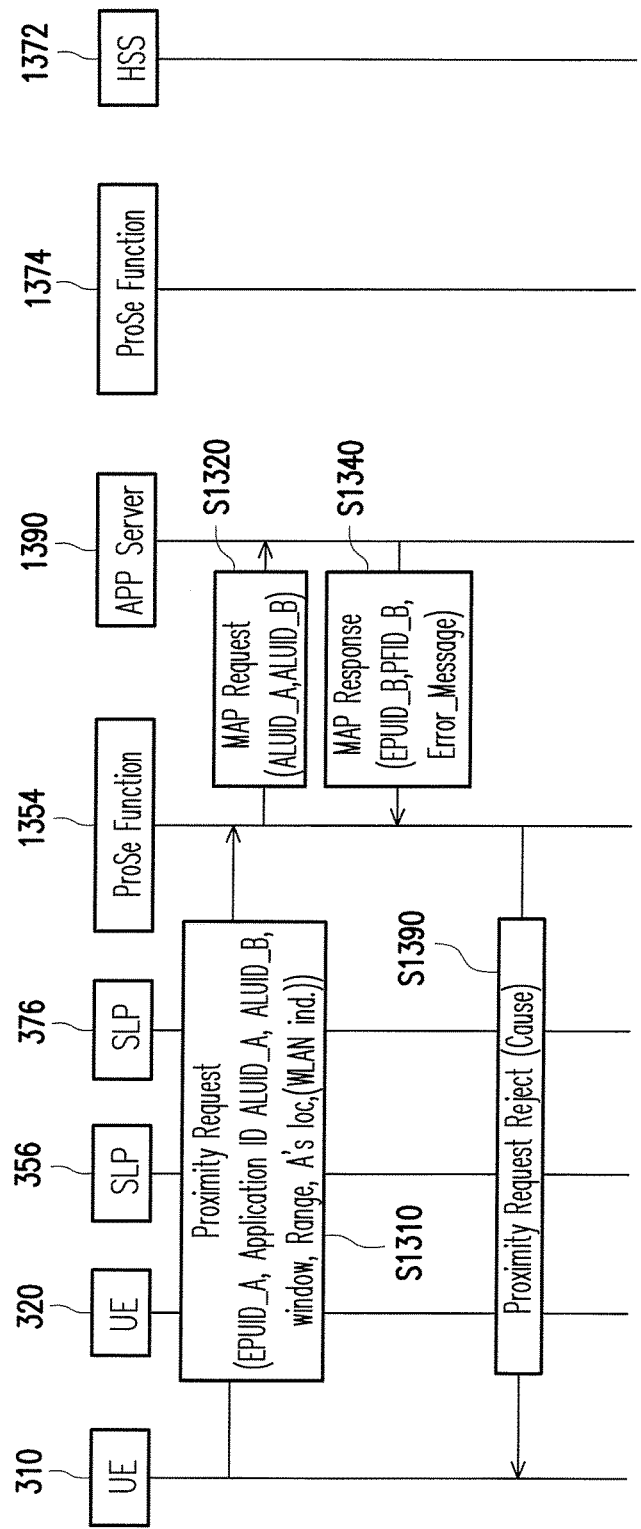
FIG. 13 illustrates a signaling diagram of a network assisted ProSe discovery process in accordance with one of the exemplary embodiment of the present disclosure.

In the third embodiment, FIG. 13 illustrates a signaling diagram of a network assisted ProSe discovery process in accordance with one of the exemplary embodiment of the present disclosure. The detailed description of the steps S1310, S1320, and S1340 may be referred to the steps S1110, S1120, and S1140 described in the FIG. 11. The difference between FIG. 11 and FIG. 13 is, in this embodiment, in response to receiving the MAP Request message from the ProSe function 1354, the APP Server 1390 would know that the ALUID_A of the UE 310 is conformed to a black list corresponding to the ALUID_B of the UE 320. Then, the MAP Response transmitted to the ProSe function 1354 would contain an Error message indicating that the permission of Proximity Request from the UE 310 is not allowed (S1340). In response to receiving the Error message from the ProSe function 1354, the ProSe function 1374 would transmit a Proximity Request Reject message (S1390) containing a "response-reject" element with PC3 EPC Control Protocol cause value #8 "Proximity validation rejected by B side", which means that the Proximity Request of the UE 310 is not rejected.

In view of the aforementioned descriptions, the present disclosure provides a D2D discovery method for a server and a network entity and a server and a network entity using the same to enhance the network assisted D2D discovery. A notification flag, a first list such as a white list, and a second list such as a black list may be configured by a user or an administrator at the server such as an APP server. Then, the proximity request procedure would be performed according to the notification flag, the first list, and the second list. A proximity request validation of the D2D discovery would be cancelled according to the notification flag and the first list. A proximity request validation response would be considered as accepting or rejecting the D2D discovery request according to the notification flag in response to validating response is not received. In addition, the proximity request would be rejected according to the second list. Accordingly, every user may configure the privacy policy such as the white, the black, and/or the notification list easily, which can further prevent the user from being requested D2D information by unknown or malicious users.

It should be noted that the adjectives "first", "second", or "third" are simply used to distinguish one item or object from another and thus may or may not imply a sequence of events.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A proximity map request method, used by a server, the method comprising:
receiving a proximity map request message of a device to device (D2D) discovery to request a network level user identifier (ID) of a discoveree, wherein the proximity map request message comprises an application layer user ID of a discoverer and an application layer user ID of the discoveree;
setting a notification flag according to the application layer user ID of the discoverer and the application layer user ID of the discoveree in response to receiving the proximity map request message; and
transmitting a proximity map response message comprising the network level user ID of the discoveree and the notification flag to a first network entity in response to setting the notification flag,
wherein the first network entity informs a second network entity whether to wait for receiving a proximity request validation response message according to the notification flag in response to the proximity request validation response message being not received.

2. The method according to claim 1, wherein setting a notification flag according to the application layer user ID of the discoverer and the application layer user ID of the discoveree in response to receiving the proximity map request message comprising:
determining whether the application layer user ID of the discoverer is conformed to a first list of the application layer user ID of the discoveree; and
setting the notification flag to cancel a proximity request validation of the D2D discovery in response to the application layer user ID of the discoverer being conformed to a first list of the application layer user ID of the discoveree.

3. The method according to claim 1, wherein setting a notification flag according to the application layer user ID of the discoverer and the application layer user ID of the discoveree in response to receiving the proximity map request message comprising:
determining whether the application layer user ID of the discoverer is conformed to a second list of the application layer user ID of the discoveree; and
transmitting the proximity map response message with an error information in response to the application layer user ID of the discoverer being conformed to the second list of the application layer user ID of the discoveree.

4. The method according to claim 1, wherein setting a notification flag according to the application layer user ID of the discoverer and the application layer user ID of the discoveree in response to receiving the proximity map request message comprising:
setting the notification flag to configure a response type of a proximity request validation of the D2D discovery.

5. A server, comprising:
a transceiver module, transmitting and receiving data; and
a processing module, coupled to the transceiver module, and is configured for:
receiving a proximity map request message of a D2D discovery to request a network level ID of a discoveree using the transceiver module, wherein the proximity map request message comprises an application layer user ID of a discoverer and an application layer user ID of the discoveree;
setting a notification flag according to the application layer user ID of the discoverer and the application layer user ID of the discoveree in response to receiving the proximity map request message; and
transmitting a proximity map response message comprising the network level user ID of the discoveree and the notification flag to a first network entity using the transceiver module in response to setting the notification flag,
wherein the first network entity informs a second network entity whether to wait for receiving a proximity request validation response message according to the notification flag in response to the proximity request validation response message being not received.

6. The server according to claim 5, the processing module is further configured for:
determining whether the application layer user ID of the discoverer is conformed to a first list of the application layer user ID of the discoveree; and
setting the notification flag to cancel a proximity request validation of the D2D discovery in response to the application layer user ID of the discoverer being conformed to the first list of the application layer user ID of the discoveree.

7. The server according to claim 5, the processing module is further configured for:
determining whether the application layer user ID of the discoverer is conformed to a second list of the application layer user ID of the discoveree; and
transmitting the proximity map response message with an error information in response to the application layer user ID of the discoverer being conformed to the second list of the application layer user ID of the discoveree.

8. The server according to claim 5, the processing module is further configured for:
setting the notification flag to configure a response type of a proximity request validation of the D2D discovery.

9. A proximity map request method, used by a network entity, the method comprising:
transmitting a proximity map request message of a D2D discovery to request a network level user ID of a discoveree, wherein the proximity map request message comprises an application layer user ID of a discoverer and an application layer user ID of the discoveree;
receiving a proximity map response message in response to the proximity map request message, wherein the proximity map response message comprises the network level user ID of the discoveree and a notification flag; and
transmitting a proximity request message comprising the network level user ID of the discoveree and the notification flag to a second network entity using the transceiver module in response to receiving the proximity map response message,
wherein the second network entity determines whether to wait for receiving a proximity request validation response message according to the notification flag in response to the proximity request validation response message being not received.

10. The method according to claim 9, wherein the notification flag indicates whether to cancel a proximity request validation of the proximity request message.

11. The method according to claim 9, wherein the notification flag indicates a response type of a proximity request validation of the proximity request message.

12. A network entity, comprising:

a transceiver module, transmitting and receiving data; and a processing module, coupled to the transceiver module, and is configured for:

transmitting a proximity map request message of a D2D discovery using the transceiver module to request a network level user ID of a discoveree, wherein the proximity map request message comprises an application layer user ID of a discoverer and an application layer user ID of the discoveree;

receiving a proximity map response message in response to the proximity map request message using the transceiver module, wherein the proximity map response message comprises the network level user ID of the discoveree and a notification flag; and transmitting a proximity request message comprising the network level user ID of the discoveree and the notification flag to another network entity using the transceiver module in response to receiving the proximity map response message, wherein the second network entity determines whether to wait for receiving a proximity request validation response message according to the notification flag in response to the proximity request validation response message being not received.

13. The network entity according to claim 12, wherein the notification flag indicates whether to cancel a proximity request validation of the proximity request message.

14. The network entity according to claim 12, wherein the notification flag indicates a response type of a proximity request validation of the proximity request message.

15. A proximity request validating method, used by a network entity, and the method comprises:

receiving a proximity request message of a D2D discovery comprising a notification flag;

transmitting a proximity request validation message in response to the proximity request message according to the notification flag in response to receiving the proximity request message; and determining whether to wait for receiving a proximity request validation response message according to the notification flag in response to the proximity request validation response message being not received.

16. The method according to claim 15, wherein transmitting the proximity request validation message according to the notification flag in response to receiving the proximity request message comprising:

cancelling the proximity request validation message according to the notification flag.

17. The method according to claim 15, wherein after the step of transmitting the proximity request validation message according to the notification flag in response to receiving the proximity request message, the method further comprises:

checking a response type of the proximity request validation response message according to the proximity request validation response message.

18. A network entity, comprising:

a transceiver module, transmitting and receiving data; and a processing module, coupled to the transceiver module, and is configured for:

receiving a proximity request message of a D2D discovery comprising a notification flag using the transceiver module;

transmitting a proximity request validation message in response to the proximity request message according to the notification flag using the transceiver module in response to receiving the proximity request message; and determining whether to wait for receiving a proximity request validation response message according to the notification flag in response to the proximity request validation response message being not received.

19. The network entity according to claim 18, the processing module is further configured for:

cancelling the proximity request validation message according to the notification flag.

20. The network entity according to claim 18, the processing module is further configured for:

checking a response type of the proximity request validation response message according to the proximity request validation response message.

* * * * *